Dec. 9, 1969  H. REICH ETAL  3,482,464
ELASTIC COUPLING
Filed March 11, 1968  2 Sheets-Sheet 1
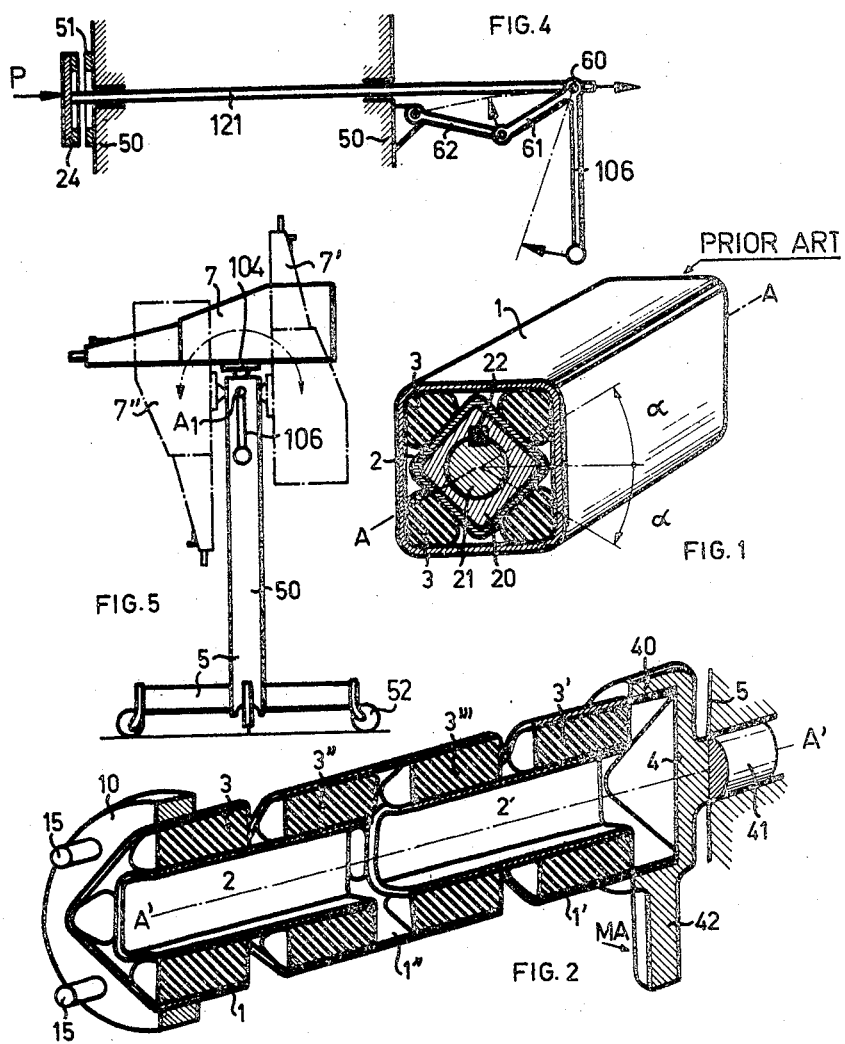
Inventors:
Heinrich Reich
Heinz Angst

United States Patent Office 3,482,464
Patented Dec. 9, 1969

3,482,464
ELASTIC COUPLING
Heinrich Reich, Wurenlos, and Heinz Angst, Glattbrugg, Switzerland, assignors to Contraves AG, Zurich, Switzerland
Filed Mar. 11, 1968, Ser. No. 712,223
Claims priority, application Switzerland, Mar. 22, 1967, 4,102/67
Int. Cl. G05g 1/00
U.S. Cl. 74—470                      5 Claims

ABSTRACT OF THE DISCLOSURE

A composite elastic cushion coupling which comprises two or more serially connected rudimentary elastic couplings. The maximum angular displacement of one end of the composite coupling with reference to the other end is the sum of angular displacements permitted by the individual rudimentary couplings.

Background of the invention

The present invention relates to elastic couplings in general, and more particularly to improvements in elastic couplings of the type wherein one coupling member which receives torque can be angularly displaced, within limits, relative to another coupling member which normally resists rotation in response to angular displacement of the one coupling member.

Various types of elastic couplings with coupling members which are movable angularly with reference to each other are known in the art. In a so-called elastic cushion coupling, a first coupling member which receives torque can be turned with reference to a second coupling member which resists such turning by way of one or more elastic cushions which are interposed between the two coupling members and undergo deformation to store energy when the first coupling member receives torque and tends to rotate the second coupling member. When the transmission of torque to the first coupling member is terminated, the cushions dissipate energy and return the first coupling member to a predetermined or neutral angular position with reference to the second coupling member. A serious drawback of such conventional elastic couplings is that the angular displacement of the first coupling member with reference to the second coupling member is rather limited. In many elastic cushion couplings, the maximum angular displacement of the first coupling member from a neutral position relative to the second coupling member is ±30 degrees. On the other hand, it is often desirable to turn an implement through angles of 90 degrees or even more beyond a neutral position and to permit automatic return movement of such implement to neutral position when the application of torque is interrupted or terminated.

Summary of the invention

Accordingly, it is an important object of our invention to provide an elastic coupling which permits greater angular displacements of a first coupling member with reference to a second coupling member than in heretofore known elastic couplings.

Another object of the invention is to provide an elastic coupling which, though capable of maintaining a supported part in an accurately determined neutral or starting position, can be used to move the supported part through angles of 90 degrees or more to either side of such neutral position.

An additional object of the invention is to provide an elastic coupling wherein the torque receiving coupling member may but need not be coaxial with the torque resisting coupling member.

A further object of the invention is to provide a coupling wherein the torque receiving coupling member can be locked in a neutral position, which occupies little room, which can be designed to carry lightweight or bulky and heavy supported parts, and which can be used in structures wherein the torque resisting coupling member is fixed or is allowed to rotate with the torque receiving coupling member.

A concomitant object of the invention is to provide a novel torque transmitting connection between the torque resisting members of an elastic coupling.

The invention is embodied in an elastic coupling which comprises a turnable torque receiving member, a torque resisting member which may but need not be coaxial with the torque receiving member, torque transmitting means between the two members, and elastic cushions or connectors interposed between each member and the torque transmitting means to yieldably oppose angular displacement of the torque receiving member with reference to the torque transmitting means and of torque transmitting means with reference to the torque resisting member. Each of these members constitutes with the torque transmitting means and the interposed cushion a rudimentary elastic coupling, i.e., the invention resides in the provision of a composite elastic coupling which comprises a series of rudimentary couplings. If desired or necessary, the torque transmitting means may constitute a second composite elastic coupling in order to allow for greater angular displacement of the torque receiving member with reference to the torque resisting member.

The novel features which are considered as characteristic of the invention are set forth in the appended claims. The improved coupling itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a fragmentary perspective view of a conventional elastic coupling;

FIG. 2 is a perspective axial sectional view of an elastic coupling which embodies one form of our invention;

FIG. 4 is a diagrammatic axial sectional view of the upper portion of the coupling shown in FIG. 3; and FIG. 5 is a schematic elevational view of a conveyance which supports an apparatus through the intermediary of a coupling of the type shown in FIGS. 3 and 4.

Description of the preferred embodiments

Figure 3:
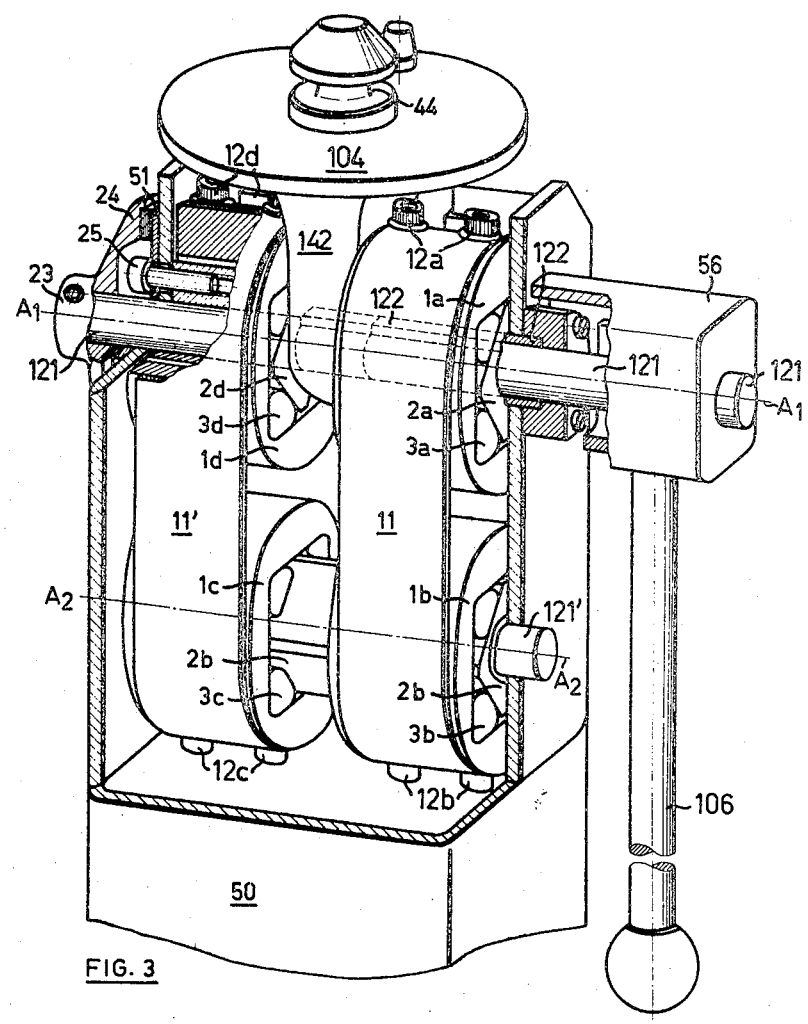
FIG. 3 is a fragmentary perspective view of an elastic coupling which embodies another form of our invention, certain portions of the coupling being shown in section.

FIG. 1 illustrates a portion of a simple conventional elastic cushion coupling which comprises a torque resisting member 1 here shown as a sleeve of square or rectangular cross-sectional outline which is held against rotation about its axis A—A. The torque receiving member of this coupling comprises a shaft 21 which is nonrotatably secured to a surrounding inner tube 20 by a key 22, and an outer tube 2 which is received in the sleeve 1 for angular displacement about the axis A—A and snugly accommodates the inner tube 20. The parts 2, 20, 21, 22 of the torque receiving member form a rigid assembly which can turn in a clockwise or in a counterclockwise direction to the extent determined by four profiled elongated strip-shaped cushions 3 of rubber or other suitable elastomeric material. These cushions are interposed between the sleeve 1 and outer tube 2 so as to substantially fill the spaces between the outer sides of the tube 2 and the corners of the sleeve 1.

The elasticity of cushions 3 can be readily selected in such a way that the torque receiving member 2, 20, 21, 22 can turn with reference to the torque resisting sleeve 1 through angles (alpha) of ±30 degrees from a neutral or unstressed position shown in FIG. 1. The cushions 3 oppose angular displacements of the shaft 21 from neutral position with a force which is substantially proportional to the applied torque, i.e., the cushions then store energy and tend to return the shaft to neutral position. The function of the members 1 and 2, 20, 21, 22 can be reversed, i.e., torque can be applied to the sleeve 1 and the shaft 21 can be held against angular movement. Also, each of these members can receive torque, but in opposite directions.

In accordance with our invention, two or more rudimentary elastic cushion couplings can be assembled in series so that, if desired, the angular displacement of the torque receiving member may equal or approximate the sum of angular displacements of torque receiving members in the individual couplings. One such composite coupling which embodies our invention and comprises a series of several rudimentary elastic cushion couplings is shown in FIG. 2. The coupling shown in this illustration can permit angular displacements of the torque receiving member in the range of ±90–100 degrees or even more, depending on the elasticity of its cushions.

The common axis of the torque resisting and torque receiving members is shown at A'—A'. The torque resisting member comprises a sleeve 1 of rectangular or square outline, a ring 10 having an opening which snugly receives a portion of the sleeve 1, and axially parallel anchoring pins 15 provided on the ring 10 and serving to secure it to a stationary non-rotatable support, not shown, e.g., to the frame of a machine. The torque receiving member comprises a sleeve 1' of rectangular or square cross-sectional outline, a ring 40 which snugly receives a portion of the sleeve 1', a disk 4 which is rigid with one axial end of the ring 40, a cylindrical extension or stub 41 rigid with the disk 4 and journalled in a stationary bearing 5 for angular movement about the axis A'—A', and a torque-applying handle or arm 42 which is rigid with the disk 4 and/or ring 40. Torque can be applied in or counter to the direction indicated by arrow MA. The improved coupling further comprises a torque transmitting unit including a pair of coaxial tubes 2, 2', an intermediate sleeve 1" which surrounds with clearance the tubes 2, 2' in the same way as shown for the sleeve 1 and tube 2 of FIG. 1, and two sets or groups of elastic cushions 3", 3"' which are respectively interposed between the sleeve 1" and tubes 2, 2'. Still further, the coupling of FIG. 2 comprises two sets of cushions 3, 3' respectively interposed between the sleeves 1, 1' and tubes 2, 2'.

When the handle 42 is turned about the axis A'—A' in or counter to the direction indicated by arrow MA, the cushions 3' undergo deformation and allow the sleeve 1' to turn with reference to the tube 2' and sleeve 1. If the angle of displacement of the handle 42 exceeds a certain angle determined by the elasticity of cushions 3', the tube 2' causes deformation of cushions 3"', thereupon of cushions 3" and finally of cushions 3 so that the maximum angular displacement of the sleeve 1' equals the sum of angular displacements of the sleeve 1' with reference to tube 2', of tube 2' with reference to the sleeve 1", of sleeve 1" with reference to the tube 2, and of tube 2 with reference to the sleeve 1. The elasticity and/or dimensions of all cushions may but need not be the same and the torque transmitting unit of this coupling may comprise more than two sets of cushions (3", 3"'), depending on the desired maximum angular displacement of sleeve 1' with reference to the sleeve 1. The sleeve 1' can carry an apparatus, instrument or implement (not shown) whose angular position must be changed and which should normally assume a neutral position in which the cushions are not subjected to stresses arising when the handle 42 is moved about the axis A'—A'.

In its simplest form, the torque transmitting unit of FIG. 2 can comprise a single tube 2 or 2' which extends into the sleeves 1 and 1' and is surrounded by cushions 3 and 3'. It is further clear that each set of cushions may comprise only two or three cushions as well as that other types of elastic connectors or cushions can be used with equal advantage without departing from the spirit of our invention. It is also clear that the deformation of cushions 3', 3"', 3", 3 need not progress in a manner as described above; the cushions of each set can undergo deformation as soon as the handle 42 is moved away from its neutral position, i.e., the deformation of all cushions can begin at the same time and can progress simultaneously as the angular displacement of handle 42 in or counter to the direction indicated by arrow MA progresses. In the embodiment of FIG. 2, the coupling comprises a series of four rudimentary elastic cushion couplings wherein the torque resisting member of any given rudimentary coupling is the torque receiving member of the adjoining rudimentary coupling. For example, the tube 2 of the rudimentary coupling which includes the sleeve 1 (torque resisting member) is the torque resisting member of the adjoining rudimentary coupling whose torque receiving member is the sleeve 1".

The total resistance offered by cushions 3, 3", 3"', 3' to angular displacement of the handle 42 from neutral position is the sum of resistances offered by individual sets of cushions. Thus, and if the handle 42 is turned through ±100 degrees, each set of cushions offers a resistance which is about one fourth of the total resistance provided, of course, that the dimensions of tubes 2, 2', sleeves 1, 1", 1' and cushions 3, 3", 3"', 3' are respectively identical and that the elasticity of all cushions is the same.

FIG. 3 shows a modification of the just described composite coupling. This modified composite coupling comprises a stationary housing or frame 50 which resembles a hollow upright column of rectangular or square cross-sectional outline. The frame supports two vertically spaced parallel shafts 121, 121' which are respectively turnable about horizontal axes $A_1$—$A_1$ and $A_2$—$A_2$. The upper shaft 121 is secured to a carrier 142 by an elongated key 122 for angular displacement in the range of ±90 degrees or more with reference to the axis $A_1$—$A_1$. The carrier 142 is rigid with a platform 104. The shaft 121 is further keyed to the torque receiving tube 2a of a first rudimentary coupling which further comprises a sleeve 1a and a set of cushions 3a interposed between the sleeve 1a and tube 2a in the same way as described in connection with FIG. 1. The sleeve 1a has a cylindrical peripheral surface and is screwed, bolted, riveted or otherwise fastened to a portion of an endless flexible steel band 11. The fasteners which connect the band 11 to the sleeve 1a are shown at 12a. The second rudimentary coupling comprises a sleeve 1b having a cylindrical peripheral surface secured to the band 11 by fasteners 12b, a tube 2b which is keyed to the shaft 121' and a set of elastic cushions 3b. It will be seen that, though the band 11 is trained around the sleeves 1a, 1b, it cannot travel lengthwise with reference thereto.

The tube 2b forms the torque receiving member of a third rudimentary coupling which further includes a sleeve 1c having a cylindrical peripheral surface and a set of elastic cushions 3c interposed between the sleeve 1c and tube 2b. It is clear that the tube 2b can be replaced by two discrete tubes each of which is keyed to the shaft 121' and each of which is surrounded by one of the sleeves 1b, 1c.

The fourth rudimentary coupling comprises a sleeve 1d having a cylindrical peripheral surface, a tube 2d which surrounds the shaft 121, and a set of elastic cushions 3d. A steel band 11' is trained around the peripheral surfaces of the sleeves 1c, 1d and is affixed thereto by fasteners 12c, 12d. The tube 2d is rotatable on the shaft 121 but is non-rotatably coupled to the frame 50 by one or more axially parallel bolts 25 or the like. The shaft 121 has a head or hub 23 which carries a brake disk 24 normally cooperating with a brake disk 51 on the frame 50 to hold the shaft 121 against angular movement and to thus maintain the carrier 142 and platform 104 in the neutral positions shown in FIG. 3. The engagement between the brake disks 24, 51 can be terminated by a disengaging lever 106 in a manner as shown in FIG. 4. This lever extends from an extension 56 of the frame 50.

FIG. 4 shows that the lever 106 is a bell crank lever which is fulcrumed on the shaft 121, as at 60, and has an arm 61 articulately connected to a link 62 which is pivotally secured to the frame 60. The lever 106 and link 62 together form a toggle mechanism which moves the brake disk 24 into frictional engagement with the brake disk 51 when the lever is turned in a counterclockwise direction to move the parts 61, 62 to the positions indicated schematically by a phantom line. The shaft 121 is then moved axially as indicated by arrow P. This arrests the carrier 142 and platform 104 in neutral position. When the lever 106 is returned to the solid-line position of FIG. 4, the carrier 142 can be turned with the shaft 121 to the extent determined by elasticity of cushions 3a–3d, either in a clockwise or in a counterclockwise direction. The carrier 142 is a functional equivalent of the handle 42 shown in FIG. 2 but it is clear that the shaft 121 can be provided with a torque applying arm or the like which can be manipulated to change the angular position of the parts 104, 142.

In the composite coupling of FIG. 3, the shaft 121 and tube 2a constitute a torque receiving member, the tube 2d and the bolt or bolts 25 constitute a torque resisting member, and the torque transmitting unit includes the parts 1a, 11, 12a, 12b, 1b, 3b, 2b, 121', 3c, 1c, 12c, 11', 12d and 1d. The cushions 3a, 3d are respectively interposed between the torque transmitting unit and sleeve 2a on the one hand and between the torque transmitting unit and sleeve 2d on the other hand. It will be noted that, contrary to the construction shown in FIG. 2, at least a portion of the torque transmitting unit can turn about an axis (A₂—A₂) which need not coincide with the common axis (A₁—A₁) of the torque receiving and torque resisting members. Furthermore, the axis of the torque resisting member (2d, 25) could coincide with the axis A₂—A₂ or it could be parallel to the axes A₁—A₁ and A₂—A₂ by carrying out relatively minor alterations in the design of the composite coupling shown in FIG. 3.

The coupling of FIG. 3 can be said to comprise several composite couplings including a first composite coupling having a torque receiving member 121, a torque resisting member 121' whose axis does not coincide with the axis of the member 121, a torque transmitting unit 1a, 11, 12a, 12b, 1b, and two sets of elastic cushions 3a, 3b. The shaft 121' is the torque receiving member of a second coupling whose torque resisting member is the tube 2d and whose torque transmitting unit includes the parts 1c, 11, 12c, 12d and 1d. This second coupling further includes the cushions 3c and 3d. Also, the sleeves 1b, 1c can be said to respectively constitute a torque receiving and a torque transmitting member of a composite coupling which includes a torque transmitting unit 2b, 121' and two cushions 3b, 3c.

The bands 11, 11' can be replaced by link chains or other endless motion transmitting devices.

FIG. 5 shows that the frame 50 can be installed on a carriage 5 or another suitable conveying device provided with wheels or rollers 52. The platform 104 has a connector 44 (see FIG. 3) which may resemble a plug and can detachably support an apparatus or instrument 7, for example, an apparatus to be used by doctors for examination and/or treatment of patients. By moving the disengaging lever 106 to a position in which the brake disks 24, 51 (FIGS. 3 and 4) are disengaged, the operator can tilt the apparatus from the solid-line position and all the way to (or even beyond) the phantom-line positions 7' and 7" as well as to an infinite number of intermediate positions. There is no danger that the apparatus 7 would overturn by gravity (i.e., that the apparatus would automatically move to one of the positions 7', 7") when the lever 106 disengages the brake because the cushions 3a–3d oppose movement of the apparatus from the solid-line neutral position.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. An elastic coupling comprising torque receiving means including a first shaft turnable about a predetermined axis and torque applying means turnable with said shaft; torque resisting means including a second shaft substantially parallel with said first shaft; torque transmitting means including a pair of sleeves each surrounding one of said shafts and connecting means secured to said sleeves to turn one thereof in response to turning of the other sleeve; and elastic cushions interposed between said sleeves and the respective shafts to yieldably oppose angular displacement of said torque receiving means with reference to said torque transmitting means and of said torque transmitting means with reference to said torque resisting means.

2. A coupling as defined in claim 1, wherein said connecting means comprises an endless flexible element trained around said sleeves and fastener means securing portions of said element to said sleeves so that, when the sleeve surrounding said first shaft is turned by way of the respective cushion, said element turns the sleeve which surrounds the second shaft against the opposition of the respective cushion.

3. A coupling as defined in claim 1, further comprising an additional torque resisting member rotatably mounted on said first shaft, means for holding said additional torque resisting member against turning with said first shaft, additional torque transmitting means interposed between said second shaft and said additional torque resisting member and additional cushions interposed between said additional torque transmitting means on the one hand and said second shaft and said additional torque resisting member on the other hand.

4. A coupling as defined in claim 3, wherein each of said torque transmitting means comprises a pair of sleeves each surrounding one of said shafts and an endless flexible band trained around and secured to the respective pair of sleeves.

5. A coupling as defined in claim 1, wherein said torque applying means comprises a carrier for a device which is arranged to turn back and forth about the axis of said first shaft.

References Cited

UNITED STATES PATENTS

| | | | |
|---|---|---|---|
| 2,126,708 | 8/1938 | Schmidt. | |
| 2,308,967 | 1/1948 | Kuss | 287—85 |
| 2,852,286 | 9/1958 | Guy et al. | 287—85 |
| 3,082,613 | 3/1963 | Reed | 287—85 XR |
| 3,113,769 | 12/1963 | Pryale | 267—57.1 |

FRED C. MATTERN, Jr., Primary Examiner

F. D. SHOEMAKER, Assistant Examiner

U.S. Cl. X.R.

64—27; 287—85